Patented Dec. 15, 1953

2,662,906

UNITED STATES PATENT OFFICE 2,662,906

CHLORAMPHENICOL ESTERS AND METHOD FOR OBTAINING SAME

William H. Edgerton, Huntington Woods, Mich., assignor to Parke, Davis & Company, Detroit, Mich., a corporation of Michigan No Drawing. Application March 3, 1951, Serial No. 213,805

9 Claims. (Cl. 260—404)

This invention relates to therapeutically valuable esters and to methods for obtaining the same. More particularly, the invention relates to esters having the general formula,

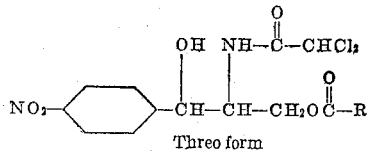

Threo form where R is an aliphatic hydrocarbon radical containing seven to nineteen carbon atoms inclusive.

From the following description it will be apparent to those skilled in the art that the 1-p - nitrophenyl - 2 - dichloroacetamidopropane-1,3-diol used as a starting material and the ester products of the invention exist in structural or diastereo-isomeric as well as optical isomeric form. The present invention is concerned with compounds having the "threo" diastereoisomeric as distinguished from the "erythro" diastereoisomeric form. The groups on the two asymmetric carbon atoms of such threo diastereoisomers have the same relative spacial configuration or arrangement as the groups on the two asymmetric carbon atoms of pseudo ephedrine and threose.

Because of the difficulty in representing these structural differences in graphic formulae, the customary formulae will be used in both the specification and claims and a notation placed below or to the side of the formula to designate the particular structural and optical configuration of the compound. Where the notation "threo form" appears, as it does above, the formula is to be interpreted in its generic sense, that is, as representing the "D-threo" and "L-threo" isomers in separated form as well as the racemic mixture thereof. Such a formula does not merely represent the optical mixture. In the specific formulae the notation (+) will be used to designate dextro-optical rotation and the notation (—) to designate levo-optical rotation.

It is an object of the invention to prepare esters having the above general formula and to provide new processes for obtaining the same.

It is also an object of the invention to provide new ester products which are therapeutically valuable as antibiotics and which are tasteless.

These and other objects which will be apparent are, in accordance with the invention, realized as set forth in the following description.

In accordance with the invention, esters having the general formula given above are produced by the monoacylation of a 1-p-nitrophenyl-2-dichloroacetamidopropane-1,3-diol compound of formula,

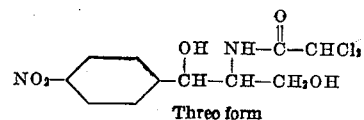

Threo form

This monoacylation can be carried out in a number of different ways but the preferred method is to react an acyl halide of formula,

or an acyl anhydride of formula,

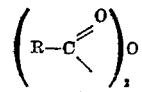

where R has the same significance as given above, with the 1-p-nitrophenyl-2-dichloroacetamidopropane-1,3-diol compound. The reaction between the acyl halide or acyl anhydride is preferably carried out under anhydrous conditions. Best results are obtained when a basic catalyst such as pyridine, triethylamine, N,N-dimethylaniline, N-ethylpiperidine or a similar tertiary amine is employed. It has also been found that the acyl halides react more smoothly and give higher yields of the desired esters than do the acyl anhydrides. The temperature during the process can be varied within quite wide limits but, in general, temperatures in excess of about 150° C. should not be used. When a basic catalyst is used it is seldom, if ever, necessary to heat the reaction mixture above about 60° C. as the reaction proceeds quite rapidly at temperatures in the neighborhood of 20 to 35° C. In carrying out the process best results are obtained when approximately equivalent quantities of the 1-p-nitrophenyl-2 - dichloroacetamidopropane - 1,3-diol compound and acylating agent are used. Of course, an excess of up to about 25% of one or the other reactants is permissible, but care should be taken to avoid large excesses of the acylating agent. Large excesses of the acylating agent materially lower the yield of the desired ester products due to the tendency for diacylation to take place under these conditions.

The products of the invention can also be prepared by the reaction of a 1-p-nitrophenyl-2-dichloroacetamido-propane-1,3-diol having the formula given above with a higher aliphatic carboxylic acid of formula,

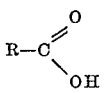

in the presence of a dehydrating agent such as dry hydrogen chloride or phosphorus pentoxide.

The ester products of the invention are unique in that they possess all of the valuable therapeutic properties of the antibiotic chloramphenicol but are utterly devoid of the very strong, disagreeable "quinine-like" taste of chloramphenicol and its 3-O-acyl esters containing a total of seven or less carbon atoms in the acyl group. The ester products of the invention are chemically stable and can be dispensed in the form of suspensions, elixirs and the like to small children and to other patients who are unable to swallow capsules or coated pills. The usual dosage is about 25 to 250 milligrams/kg. per day, depending somewhat, of course, on the nature and extent of the malady being treated.

The invention is illustrated by the following examples.

Example 1

A mixture consisting of 10 g. of D-(—)-threo-1-p-nitrophenyl - 2 - dichloroacetamidopropane-1,3-diol (chloramphenicol) and 9.8 g. of caprylyl chloride in 200 cc. of pyridine is allowed to stand at room temperature for about twelve to fifteen hours. The mixture is poured into one liter of water and the thick syrup which separates collected and dissolved in 300 cc. of ether. The ether solution is washed with an equal volume of 5% hydrochloric acid, 5% sodium bicarbonate solution and water. The ether solution is dried and the ether distilled. The syrupy residue crystallizes on standing to yield the desired D-(+)-threo-1-p-nitrophenyl - 2 - dichloroacetamido-3-caprylyloxypropane-1-ol as a white solid: M. P. 61-2° C. after recrystallization from ethanol; $(\alpha)_D^{26} = +7.97°$ in ethyl acetate. The formula of this product is,

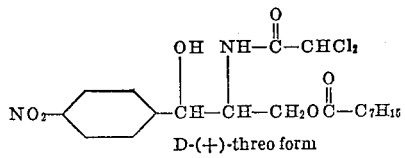

Example 2

5.9 g. of pelargonyl chloride is added to a solution of 10 g. of D-(—)-threo-1-p-nitrophenyl-2-dichloroacetamidopropane - 1,3 - diol (chloramphenicol) in 40 cc. of pyridine and the resulting solution allowed to stand at room temperature for one day. The reaction mixture is poured into 300 cc. of water and the crude product collected. Recrystallization from benzene yields the desired D-(+)-threo-1-p-nitrophenyl-2-dichloroacetamido - 3 - pelargonyloxypropane - 1-ol of formula,

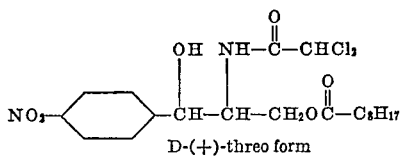

as a white, crystalline solid; M. P. 101° C.; $(\alpha)_D^{26} = +7.35°$ in ethyl acetate.

Example 3

57.5 g. of lauroyl chloride is added to 80 g. of D-(—)-threo - 1 - p-nitrophenyl-2-dichloroacetamidopropane-1,3-diol (chloramphenicol) in 120 cc. of pyridine and the resulting solution allowed to stand at room temperature for two days. The reaction mixture is poured into 500 cc. of water and the crude ester collected. The crude D-(+)-threo-1-p-nitrophenyl-2-dichloroacetamido - 3 - lauroyloxypropane-1-ol is purified by recrystallization from ethanol; M. P. 79–80° C.;

$$(\alpha)_D^{26} = +8.4°$$

in ethyl acetate. The formula of this product is,

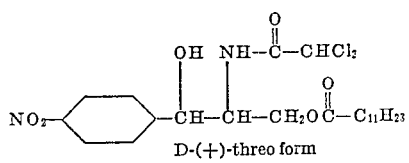

Example 4

16 g. of myristoyl chloride is added to 20 g. of D-(—)-threo-1-p-nitrophenyl - 2-dichloroacetamidopropane-1,3-diol (chloramphenicol) in 60 cc. of pyridine. The reaction mixture is allowed to stand at room temperature for one day and then poured into 500 cc. of water. The crude product is collected and purified by recrystallization from ethanol to obtain the desired D-(+)-threo-1-p-nitrophenyl-2-dichloroacetamido - 3 - myristoyloxypropane-1-ol of formula,

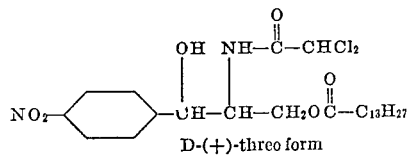

in pure form; M. P. 84° C.; $(\alpha)_D^{26} = +5.85°$ in ethyl acetate.

Example 5

1674 g. of palmitoyl chloride is added to 1870 g. of D-(—) - threo - 1 - p-nitrophenyl-2-dichloroacetamidopropane-1,3-diol (chloramphenicol) in 2700 cc. of pyridine and the solution stirred for one hour. The mixture is poured into 16 liters of water and the solid collected. Recrystallization of the crude product from benzene yields the desired D - (+) - threo-1-p-nitrophenyl-2-dichloroacetamido-3-palmitoyloxypropane - 1-ol in pure form; M. P. 90° C.; $(\alpha)_D^{26} = +5.1°$ in ethyl acetate. The formula of this product is,

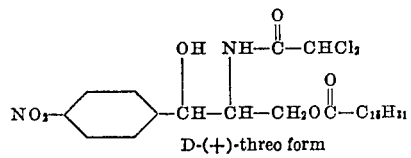

Example 6

15 g. of stearoyl chloride is added to a solution of 16 g. of D-(—)-threo-1-p-nitrophenyl-2-dichloroacetamidopropane - 1,3 - diol (chloramphenicol) in 50 cc. of pyridine and the resulting mixture allowed to stand at room temperature for two days. The reaction mixture is poured into 300 cc. of water and the crude D-(+)-threo- 1-p-nitrophenyl-2-dichloroacetamido-3-stearoyl-oxypropane-1-ol of formula,

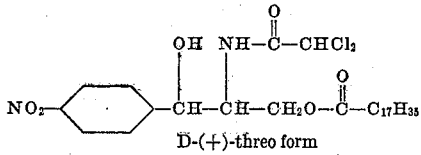

D-(+)-threo form collected and purified by recrystallization from benzene; M. P. 91–92° C.; $(\alpha)_D^{26} = +5.75°$ in ethyl acetate.

*Example 7*

9 g. of palmitoyl chloride is added to a solution of 10 g. of DL-threo-1-p-nitrophenyl-2-dichloroacetamidopropane - 1,3 - diol (optically racemic chloramphenicol) in 40 cc. of pyridine and the resulting mixture allowed to stand at room temperature for twenty minutes. The reaction mixture is poured into 400 cc. of water, the crude DL-threo-1-p-nitrophenyl-2-dichloroacetamido-3-palmitoyloxypropane-1-ol separated and purified by recrystallization from benzene. The formula of this product is,

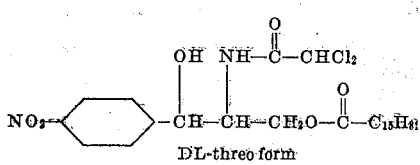

DL-threo form

*Example 8*

6.5 g. of oleoyl chloride is added to a solution of 6.5 g. of D-(−)-threo-1-p-nitrophenyl-2-dichloroacetamidopropane - 1,3 - diol (chloramphenicol) in pyridine. The mixture is allowed to stand overnight at room temperature and then poured into water. The crude product is collected, washed with water and dissolved in ether. The ether solution is washed with dilute hydrochloric acid, then with dilute sodium bicarbonate solution and finally with water. The ether solution is dried and the ether distilled to obtain the desired D-(+)-threo-1-p-nitrophenyl-2-dichloroacetamido - 3 - oleoyloxypropane-1-ol as a thick syrup. The formula of this product is,

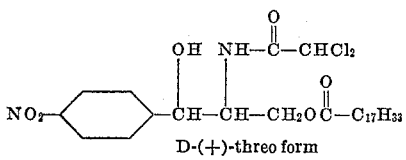

D-(+)-threo form

*Example 9*

14.4 g. of α-methyl hexadecanoyl chloride is added to 15 g. of DL-threo-1-p-nitrophenyl-2-dichloroacetamidopropane - 1,3 - diol (optically racemic chloramphenicol) in 100 cc. of pyridine and the resulting mixture allowed to stand at room temperature overnight. The reaction mixture is poured into water, the crude product collected and taken up in ether. The ether solution is washed successively with water, dilute hydrochloric acid, dilute sodium bicarbonate and finally with water. The ether solution is dried and the ether distilled. The residual DL-threo-1 - p - nitrophenyl - 2 - dichloroacetamido-3-α-methyl-hexadecanoyloxypropane-1-ol of formula,

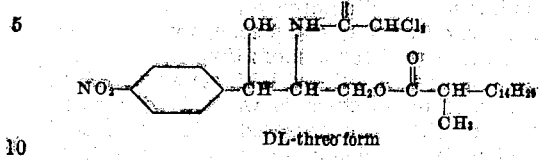

DL-threo form is taken up in and crystallized from benzene.

*Example 10*

A mixture consisting of 16.5 g. of arachidoyl chloride, 15 g. of D-(−)-threo-1-p-nitrophenyl-2-dichloroacetamidopropane - 1,3 - diol (chloramphenicol) and 100 cc. of pyridine is allowed to stand at room temperature overnight. The reaction mixture is poured into water, the crude product collected and purified by recrystallization from benzene. The product thus obtained is D-(+)-threo-1-p-nitrophenyl - 2 - dichloroacetamido - 3 - arachidoyloxypropane - 1 - ol of formula,

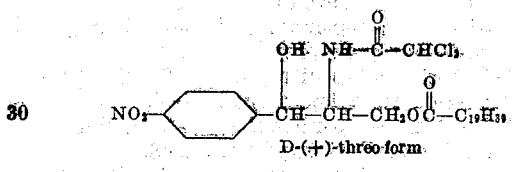

D-(+)-threo form

*Example 11*

A mixture consisting of 3.2 g. of D-(−)-threo-1-p-nitrophenyl - 2 - dichloroacetamidopropane-1,3-diol (chloramphenicol), 2.9 g. of palmitoyl chloride and 200 cc. of benzene is heated under reflux (about 82° C.) for twenty hours. The clear solution is concentrated to a volume of 100 cc. and diluted with petroleum ether. The D-(+)-threo-1-p-nitrophenyl - 2 - dichloroacetamido-3-palmitoyloxypropane-1-ol which separates is collected and purified by recrystallization from benzene; M. P. 90° C.; $(\alpha)_D^{26} = +5.1°$ in ethyl acetate.

*Example 12*

A mixture consisting of 3.2 g. of D-(−)-threo-1-p-nitrophenyl - 2 - dichloroacetamidopropane-1,3-diol (chloramphenicol), 5.5 g. of stearic anhydride and 150 cc. of pyridine is warmed slightly until a clear solution is obtained. The clear solution is allowed to stand overnight at room temperature and then poured into water. The crude D-(+)-threo - 1 - p - nitrophenyl-2-dichloroacetamido-3-stearoyloxypropane-1-ol is collected and purified by recrystallization from benzene and petroleum ether; M. P. 90–91° C.; $(\alpha)_D^{26} = +5.75°$ in ethyl acetate.

*Example 13*

2.08 g. of stearic acid is heated with 6 cc. of trifluoroacetic anhydride at 45–50° C. for thirty minutes. 2.2 g. of D-(−)-threo-1-p-nitrophenyl - 2 - dichloroacetamidopropane-1,3-diol (chloramphenicol) is added to the mixture containing stearic acid and the mixture heated for two hours at 55–60° C. The clear solution is poured into an excess of sodium bicarbonate solution and the white solid product collected. Recrystallization from ethanol yields the pure D-(+)-threo-1-p-nitrophenyl - 2 - dichloroacetamido-3-stearoyloxypropane-1-ol; M. P. 92° C.; $(\alpha)_D^{26} = +5.75°$ in ethyl acetate.

Example 14

30 g. of palmitoyl chloride is added to a mixture composed of 32 g. of D-(—)-threo-1-p-nitrophenyl - 2 - dichloroacetamidopropane-1,3-diol, 50 cc. of benzene and 9 cc. of pyridine. The mixture is stirred for a short time at room temperature and then diluted with an equal volume of ether. The mixture is washed with water, dried and then concentrated. The residue is diluted with petroleum ether and the D-(+)-threo-1-p-nitrophenyl - 2 - dichloroacetamido-3-palmitoyloxypropane-1-ol collected. Recrystallization from benzene yields the pure product; M. P. 90° C.; $(\alpha)_D^{26}=+5.1°$ in ethyl acetate.

What I claim is:

1. A compound of the formula,

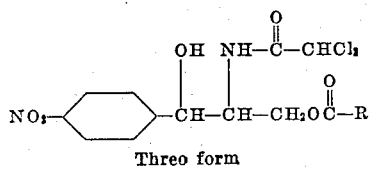

Threo form where R is an aliphatic hydrocarbon radical containing 7 to 19 carbon atoms inclusive.

2. D-(+)-threo-1-p-nitrophenyl - 2 - dichloroacetamido-3-lauroyloxypropane-1-ol.

3. D-(+)-threo-1-p-nitrophenyl - 2 - dichloroacetamido-3-myristoyloxypropane-1-ol.

4. D-(+)-threo-1-p-nitrophenyl - 2 - dichloroacetamido-3-palmitoyloxypropane-1-ol.

5. D-(+)-threo-1-p-nitrophenyl - 2 - dichloroacetamido-3-stearoyloxypropane-1-ol.

6. DL-threo-1-p-nitrophenyl - 2 - dichloroacetamido-3-palmitoyloxypropane-1-ol.

7. Process for obtaining a compound of formula,

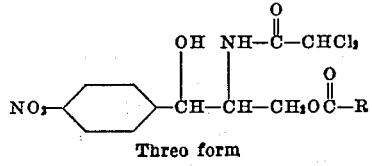

Threo form which comprises reacting a 1-p-nitrophenyl-2-dichloroacetamidopropane-1,3-diol compound of formula,

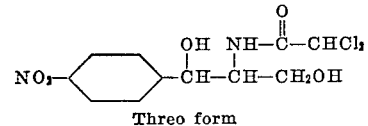

Threo form with approximately an equivalent quantity of an acylating agent of the class consisting of RCO-halogen and RCO—O—COR at a temperature below 150° C., where R is an aliphatic hydrocarbon radical containing seven to nineteen carbon atoms inclusive.

8. Process according to claim 7 wherein the reaction is carried out in the presence of a tertiary amine at a temperature below 60° C.

9. Process for obtaining D-(+)-threo-1-p-nitrophenyl-2-dichloroacetamido - 3 - palmitoyloxypropane - 1 - ol which comprises reacting D-(—)-threo-1-p-nitrophenyl - 2 - dichloroacetamidopropane-1,3-diol with an approximately equivalent quantity of palmitoyl chloride under anhydrous conditions at a temperature between 20 and 35° C. in the presence of a tertiary amine.

WILLIAM H. EDGERTON.

References Cited in the file of this patent

UNITED STATES PATENTS

| Number | Name | Date |
|---|---|---|
| 2,513,346 | Moersch et al. | July 4, 1950 |
| 2,514,376 | Crooks et al. | July 11, 1950 |
| 2,538,765 | Crooks et al. | Jan. 23, 1951 |
| 2,543,269 | Bambas | Feb. 27, 1951 |
| 2,545,094 | Long et al. | Mar. 13, 1951 |
| 2,586,661 | Jacob et al. | Feb. 19, 1952 |